(12) United States Patent
Ando

(10) Patent No.: US 10,911,624 B2
(45) Date of Patent: Feb. 2, 2021

(54) SERVER, METHOD OF CONTROLLING DATA COMMUNICATION, AND STORAGE MEDIUM

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/697,777

(22) Filed: Nov. 27, 2019

(65) Prior Publication Data

US 2020/0177749 A1 Jun. 4, 2020

(30) Foreign Application Priority Data

Nov. 30, 2018 (JP) .................. 2018-224344
Nov. 20, 2019 (JP) .................. 2019-209642

(51) Int. Cl.
*G06F 21/44* (2013.01)
*H04N 1/00* (2006.01)
*H04M 1/725* (2006.01)
*G06F 3/12* (2006.01)
*G09B 3/00* (2006.01)

(52) U.S. Cl.
CPC ....... *H04N 1/00514* (2013.01); *G06F 3/1204* (2013.01); *G06F 3/1236* (2013.01); *H04M 1/72561* (2013.01); *H04N 1/00352* (2013.01); *G06F 3/1288* (2013.01); *G06F 3/1292* (2013.01); *G09B 3/00* (2013.01)

(58) Field of Classification Search
USPC ....... 358/1.1–3.29, 1.11–1.18; 382/155–162, 382/181–229
See application file for complete search history.

(56) References Cited

U.S. PATENT DOCUMENTS

2001/0054066 A1* 12/2001 Spitzer .................... H04L 67/02
709/203
2004/0004737 A1* 1/2004 Kahn ................. H04N 1/00151
358/1.15
2004/0075857 A1 4/2004 Akiyoshi et al.
(Continued)

FOREIGN PATENT DOCUMENTS

JP 2014-149633 8/2014

*Primary Examiner* — Marcellus J Augustin
(74) *Attorney, Agent, or Firm* — Oblon, McClelland, Maier & Neustadt, L.L.P.

(57) ABSTRACT

A server includes circuitry configured to receive, from a transmission source terminal via a communication network, browser identification information identifying a web browser installed on the transmission source terminal, based on a determination that the transmission source terminal is a mobile terminal and the browser identification information indicates one browser created for the mobile terminal, transmit, to the transmission source terminal being the mobile terminal, a first application storing location information indicating a storing location of a first application, and based on a determination that the transmission source terminal is an image forming apparatus and the browser identification information indicates another browser created for the image forming apparatus, transmit, to the transmission source terminal being the image forming apparatus, a second application storing location information indicating a storing location of a second application.

11 Claims, 12 Drawing Sheets

(56) References Cited

U.S. PATENT DOCUMENTS

| | | |
|---|---|---|
| 2004/0218208 A1 | 11/2004 | Akiyoshi et al. |
| 2004/0255263 A1 | 12/2004 | Ando |
| 2005/0044179 A1* | 2/2005 | Hunter .................... H04L 67/06 709/218 |
| 2006/0070087 A1 | 3/2006 | Ando et al. |
| 2006/0077119 A1* | 4/2006 | Zhang ................ H04N 1/00503 345/2.1 |
| 2007/0047017 A1 | 3/2007 | Ando et al. |
| 2007/0124510 A1 | 5/2007 | Ando |
| 2008/0005029 A1 | 1/2008 | Ando |
| 2008/0066084 A1 | 3/2008 | Akiyoshi et al. |
| 2008/0098389 A1 | 4/2008 | Akiyoshi et al. |
| 2009/0019440 A1 | 1/2009 | Ando |
| 2009/0276826 A1 | 11/2009 | Ando |
| 2010/0309502 A1 | 12/2010 | Ando et al. |
| 2012/0131143 A1* | 5/2012 | Nakazawa ............ H04L 9/3271 709/218 |
| 2013/0073719 A1 | 3/2013 | Ando |
| 2013/0114095 A1 | 5/2013 | Akiyoshi et al. |
| 2013/0185605 A1 | 7/2013 | Ando et al. |
| 2013/0242331 A1 | 9/2013 | Ando |
| 2013/0258407 A1 | 10/2013 | Akiyoshi et al. |
| 2013/0308161 A1 | 11/2013 | Ando et al. |
| 2014/0016165 A1 | 1/2014 | Ando |
| 2014/0365900 A1* | 12/2014 | Chu .................... G06F 16/9554 715/738 |
| 2015/0086122 A1* | 3/2015 | Tamura ............... H04L 67/2814 382/217 |
| 2015/0186188 A1 | 7/2015 | Ando |
| 2015/0264200 A1 | 9/2015 | Ando |
| 2015/0281332 A1 | 10/2015 | Naitoh et al. |
| 2016/0119506 A1 | 4/2016 | Namihira et al. |
| 2016/0342577 A1 | 11/2016 | Ando |
| 2017/0102865 A1 | 4/2017 | Ando |
| 2017/0272601 A1 | 9/2017 | Ando |
| 2017/0339232 A1 | 11/2017 | Ando |
| 2018/0084121 A1 | 3/2018 | Ando |
| 2018/0176417 A1 | 6/2018 | Ando |

* cited by examiner

FIG. 6A

| SERVICE ID (SERVICE IDENTIFICATION INFORMATION) | BROWSER ID (BROWSER IDENTIFICATION INFORMATION) | URL (APPLICATION STORING LOCATION INFORMATION) |
|---|---|---|
| Tag01 (SCHOOL A) | Br01 (BROWSER FOR SMARTPHONE) | http://··· (APPLICATION FOR IMAGE CAPTURING) |
| Tag01 (SCHOOL A) | Br02 (BROWSER FOR MFP) | Http://··· (SCANNING APPLICATION FOR RECOGNIZING QR CODE) |
| Tag02 (SCHOOL B) | Br01 (BROWSER FOR SMARTPHONE) | http://··· (APPLICATION FOR IMAGE CAPTURING) |
| ··· | ··· | ··· |

FIG. 6B

| SERVICE ID (SERVICE IDENTIFICATION INFORMATION) | FILE NAME | LECTURE NUMBER | STUDENT NUMBER | DATE |
|---|---|---|---|---|
| Tag01 (SCHOOL A) | ···jpeg | MathA_01 | ST001 | 2018/11/1 |
| Tag01 (SCHOOL A) | ···jpeg | MathA_01 | ST002 | 2018/11/1 |
| ··· | ··· | ··· | ··· | ··· |

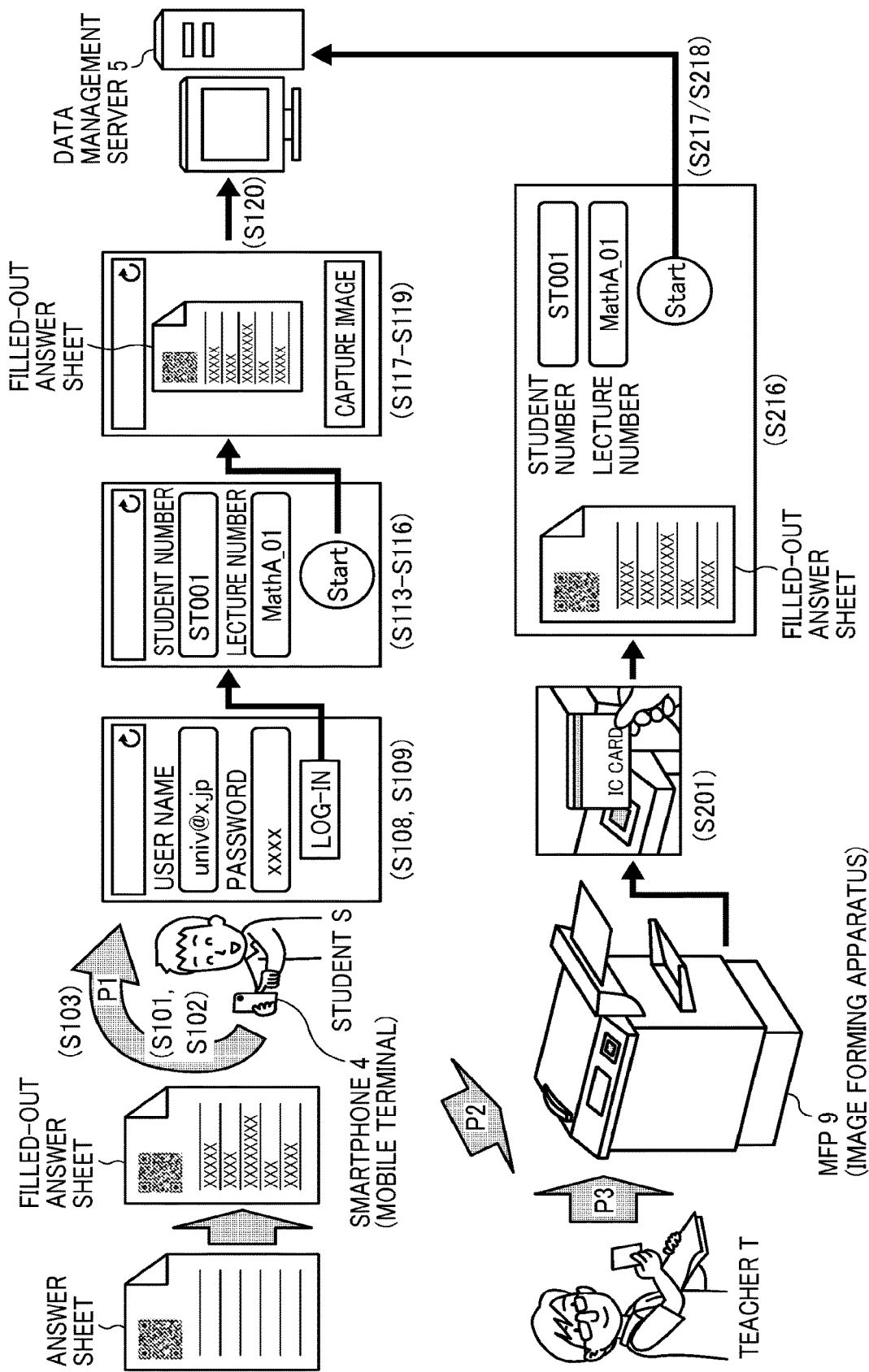

SERVER, METHOD OF CONTROLLING DATA COMMUNICATION, AND STORAGE MEDIUM

CROSS-REFERENCE TO RELATED APPLICATIONS

This application claims priority pursuant to 35 U.S.C. § 119(a) to Japanese Patent Application Nos. 2018-224344, filed on Nov. 30, 2018, and 2019-209642 filed on Nov. 20, 2019 in the Japan Patent Office, the disclosure of which are incorporated by reference herein in their entirety.

BACKGROUND

Technical Field

The present disclosure relates to a server, a method of controlling data communication, and a storage medium.

Background Art

Digital devices have been introduced in schools, with which teachers can collect electronic data corresponding to answers to questions, contents of reports, and student numbers, or the like instead of collecting sheets, such as test answer sheets, homework report sheets, and student attendance confirmation cards from the students, with which the collection workload of the teachers can be reduced. For example, a server can automatically select educational materials suitable for students from a subject database, sends test question data to a personal computer (PC) of each student, and then each student inputs answers on the personal computer and sends back the electronic data to the server.

SUMMARY

As one aspect of the present disclosure, a server is devised. The server includes circuitry configured to receive, from a transmission source terminal via a communication network, browser identification information identifying a web browser installed on the transmission source terminal, based on a determination that the transmission source terminal is a mobile terminal and the browser identification information indicates one browser created for the mobile terminal, transmit, to the transmission source terminal being the mobile terminal, a first application storing location information indicating a storing location of a first application, and based on a determination that the transmission source terminal is an image forming apparatus and the browser identification information indicates another browser created for the image forming apparatus, transmit, to the transmission source terminal being the image forming apparatus, a second application storing location information indicating a storing location of a second application.

As another aspect of the present disclosure, a method of controlling data communication using a server is devised. The method includes receiving, from a transmission source terminal via a communication network, browser identification information identifying a web browser installed on the transmission source terminal, based on a determination that the transmission source terminal is a mobile terminal and the browser identification information indicates one browser created for the mobile terminal, transmitting, to the transmission source terminal being the mobile terminal, a first application storing location information indicating a storing location of a first application, and based on a determination that the transmission source terminal is an image forming apparatus and the browser identification information indicates another browser created for the image forming apparatus, transmitting, to the transmission source terminal being the image forming apparatus, a second application storing location information indicating a storing location of a second application.

As another aspect of the present disclosure, a non-transitory computer readable storage medium storing one or more instructions that, when performed by one or more processors, cause the one or more processors to execute a method of controlling data communication using a server is devised. The method includes receiving, from a transmission source terminal via a communication network, browser identification information identifying a web browser installed on the transmission source terminal, based on a determination that the transmission source terminal is a mobile terminal and the browser identification information indicates one browser created for the mobile terminal, transmitting, to the transmission source terminal being the mobile terminal, a first application storing location information indicating a storing location of a first application, and based on a determination that the transmission source terminal is an image forming apparatus and the browser identification information indicates another browser created for the image forming apparatus, transmitting, to the transmission source terminal being the image forming apparatus, a second application storing location information indicating a storing location of a second application.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 6A is a conceptual diagram of an application management table;

FIG. 6B is a conceptual diagram of an image management table;

FIG. 7 is a scheme of processing and operation of uploading data using three patterns;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a communication system according to an embodiment in detail with reference to the drawings.

(System Configuration)

Figure 1:
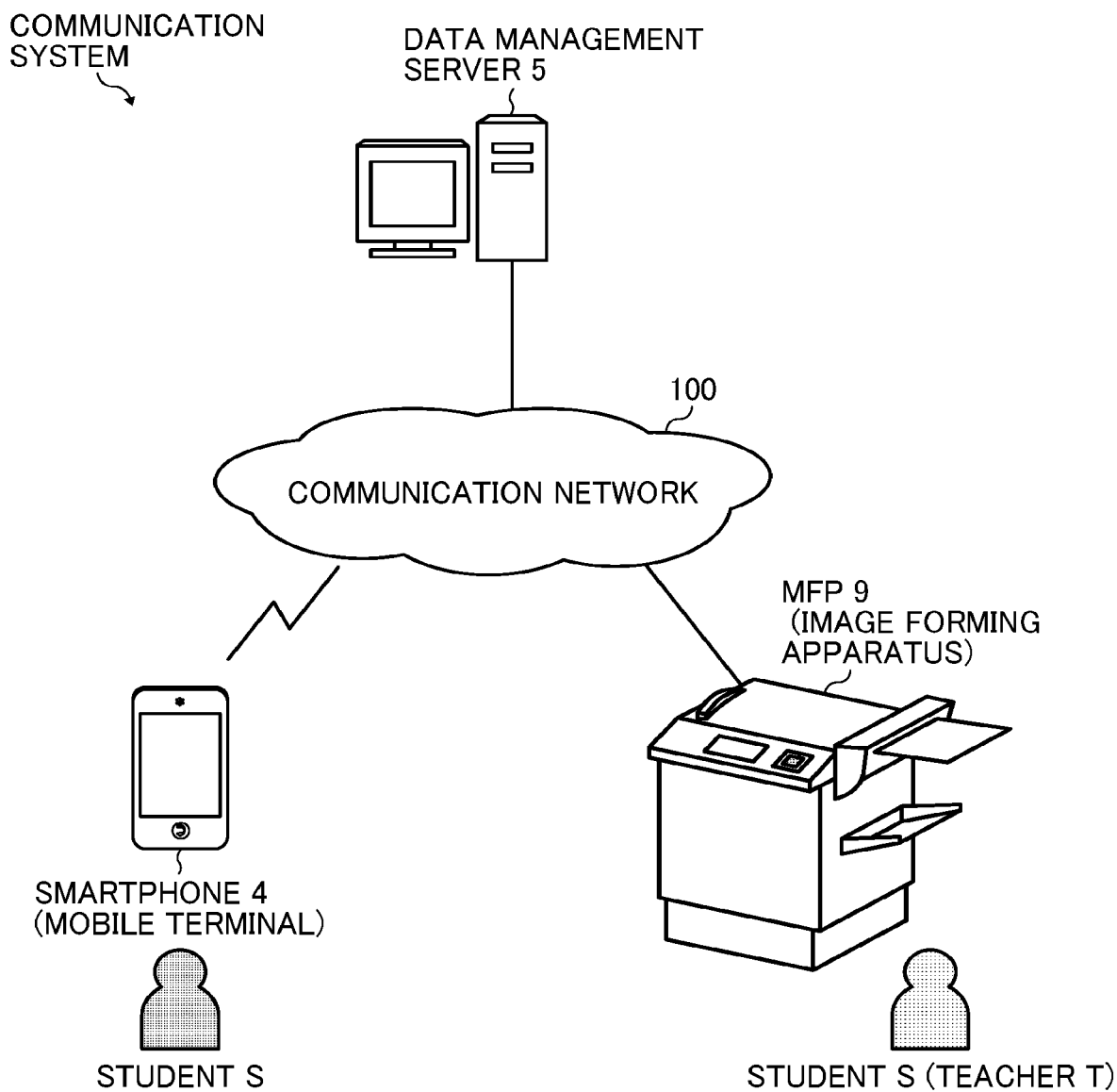
FIG. 1 is a schematic diagram of a communication system according to an embodiment of this disclosure.

Hereinafter, a description is given of an outline of the communication system. FIG. 1 is a schematic configuration of the communication system according to the embodiment. Hereinafter, a description is given of a case of applying the communication system to a school, such as university.

As illustrated in FIG. 1, the communication system includes, for example, a smartphone 4 carried or used by a user, such as student S, a data management server 5 managed or used by the school, and a multifunction peripheral/product/printer (MFP) 9 disposed in the school. The MFP 9 can be used by any student S or any teacher T. Hereinafter, the student S and the teacher T indicate one or more students and teachers.

The number of the smartphone 4 may correspond to the number of students, and a plurality of MFPs may be disposed in the school as the MFP 9. For the simplicity of description, FIG. 1 illustrates a case including one smartphone and one MFP. Further, the data management server 5 can consist of a single computer or a plurality of computers. The data management server 5 may be managed by the school, or by a service provider that provides services using the communication system.

Further, the smartphone 4, the data management server 5 and the MFP 9 configuring the communication system can communicate with each other via a communication network 100. The communication network 100 employs, for example, the Internet, mobile communication network, local area network (LAN), or the like.

The communication network 100 can employ not only wired communication network, but also wireless communication network, such as third generation (3G), worldwide interoperability for microwave access (WiMAX), and long term evolution (LTE).

The MFP 9 can communicate with an integrated circuit (IC) card carried or used by each teacher T or each student S using short-range communication technologies, such as near field communication (NFC: registered trademark), and Bluetooth (registered trademark).

The smartphone 4 is an example of a mobile terminal, but is not limited thereto. The mobile terminal includes, for example, a tablet personal computer (PC), a laptop computer, and a smartwatch. The MFP 9 is an example of an image forming apparatus, but is not limited thereto. The image forming apparatus can be, for example, a scanner. In this disclosure, the mobile terminal is described as an example of a first terminal while the image forming apparatus is described as an example of a second terminal.

(Hardware Configuration)

Hereinafter, a description is given of a hardware configuration of the terminal, apparatus, and server configuring the communication system with reference to FIGS. 2 to 4.

(Hardware Configuration of Smartphone)

Figure 2:
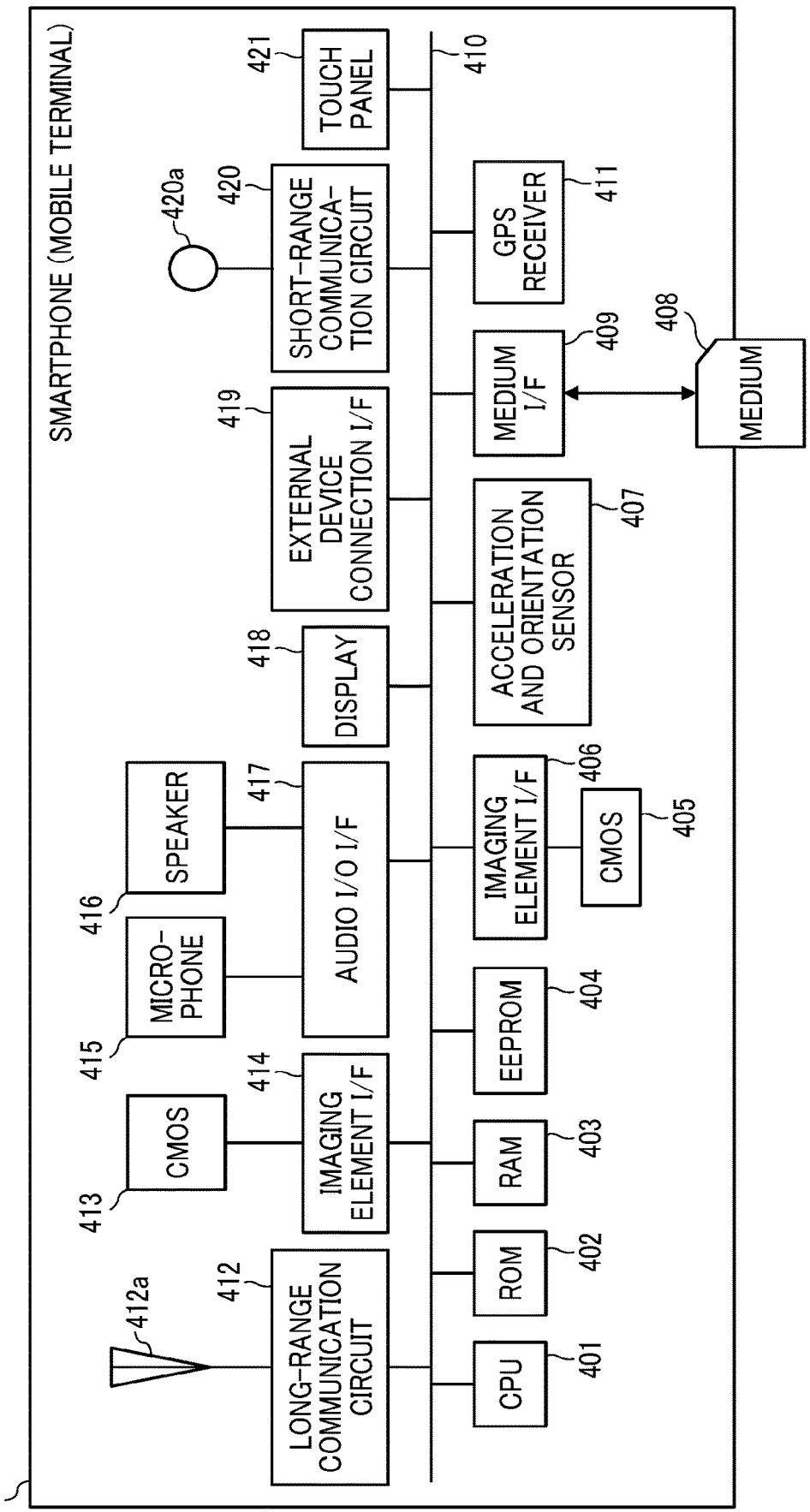
FIG. 2 is an example of a hardware block diagram of a smartphone.

FIG. 2 is an example of a hardware block diagram of the smartphone 4. As illustrated in FIG. 2, the smartphone 4 includes, for example, a CPU 401, a read-only memory (ROM) 402, a random access memory (RAM) 403, an electrically erasable programmable read-only memory (EEPROM) 404, a complementary metal oxide semiconductor (CMOS) sensor 405, an imaging element interface (I/F) 406, an acceleration and orientation sensor 407, a medium I/F 409, and a global positioning system (GPS) receiver 411.

The CPU 401 controls operations of the smartphone 4 entirely. The ROM 402 stores programs used for driving the CPU 401, such as initial program loader (IPL). The RAM 403 is used as a work area of the CPU 401. Under the control of the CPU 401, the EEPROM 404 reads or writes various data, such as one or more programs created for smartphone. The CMOS sensor 405 is a built-in type imaging unit that captures an image of object (e.g., self-image) to acquire image data under the control of the CPU 401. Instead of the CMOS sensor, a charge coupled device (CCD) sensor can be used as the imaging unit. The imaging element interface I/F 406 is a circuit that controls the driving of the CMOS sensor 405. The acceleration and orientation sensor 407 includes various sensors, such as electronic magnetic compass used for detecting geomagnetism, gyrocompass, and acceleration sensor to detect the geomagnetism. The medium I/F 409 controls reading or writing (storing) of data to a medium 408 (recording medium), such as flash memory. The GPS receiver 411 receives GPS signals from GPS satellites.

The smartphone 4 further includes, for example, a long-range communication circuit 412, a CMOS sensor 413, an imaging element I/F 414, a microphone 415, a speaker 416, an audio input-output (I/O) interface (I/F) 17, a display 418, an external device connection interface (I/F) 419, a short-range communication circuit 420, an antenna 40a for the short-range communication circuit 420, and a touch panel 421.

The long-range communication circuit 412 is a circuit that communicates with other device via the communication network 100. The CMOS sensor 413 is a built-in type imaging unit that captures an image of object to acquire image data under the control of the CPU 401. The imaging element I/F 414 is a circuit that controls the driving of the CMOS sensor 413. The microphone 415 is a built-in type circuit that converts audio into electrical signals. The speaker 416 is a built-in type circuit that converts electrical signals into physical vibration to generate audio, such as music and voice. The audio input/output I/F 417 is a circuit that processes an input and output of audio signals with the microphone 415 and the speaker 416 under the control of the CPU 401. The display 418 is a type of display unit, such as liquid crystal and organic electro luminescence (OEL), which displays an image of object and various icons, or the like. The external device connection I/F 419 is an interface for connecting with various external devices. The short-range communication circuit 420 is a communication circuit using, for example, near field communication (NFC: registered trademark) or Bluetooth (registered trademark). The touch panel 421 is one type of an input unit that is pressed by a user when operating the smartphone 4.

The smartphone 4 further includes, for example, a bus line 410. The bus line 410 is an address bus and a data bus for electrically connecting each one of components, such as the CPU 401, illustrated in FIG. 2.

(Hardware Configuration of Data Management Server)

Figure 3:
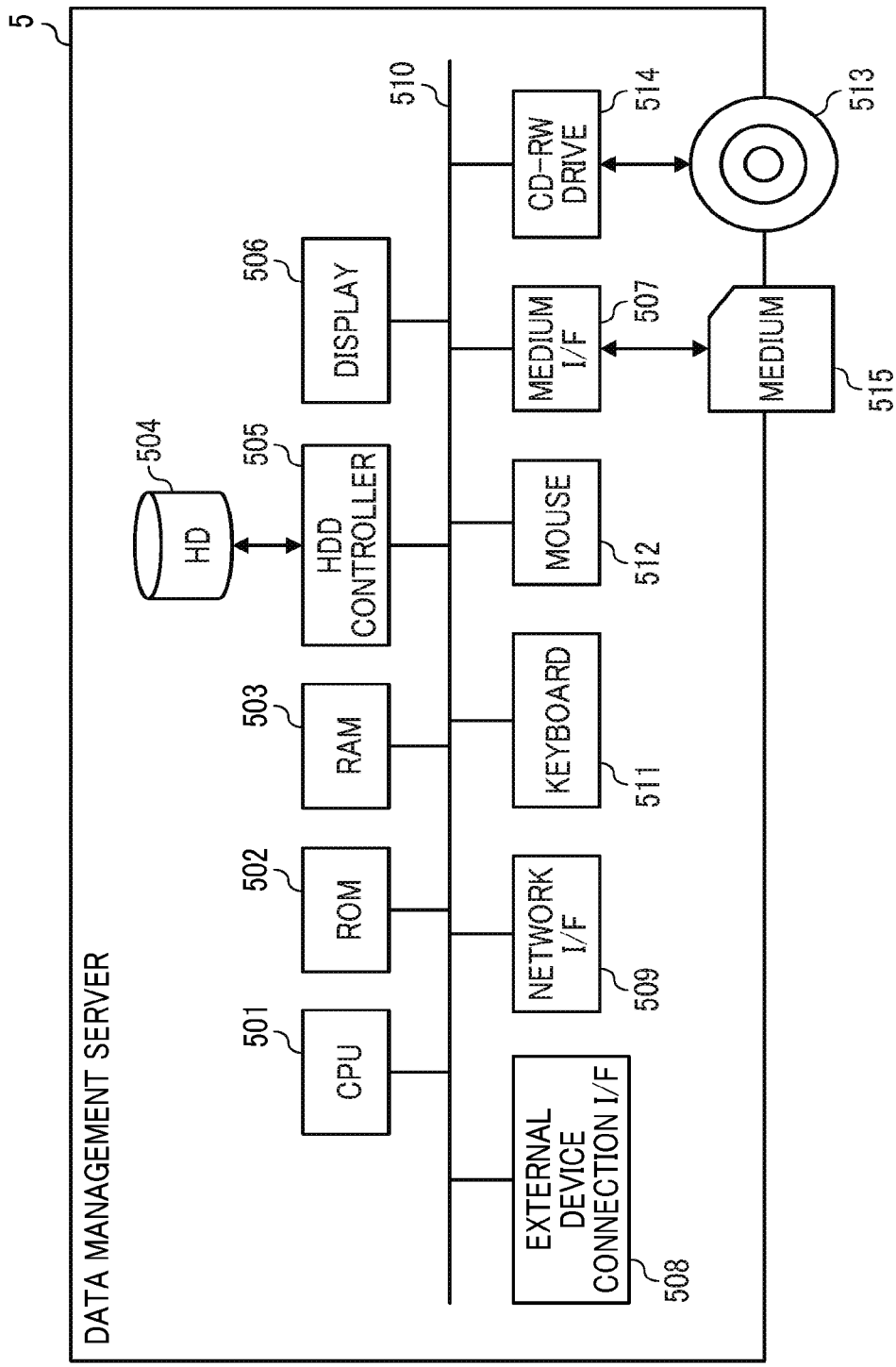
FIG. 3 an example of a hardware block diagram of a data management server.

FIG. 3 is an example of a hardware block diagram of the data management server 5. As illustrated in FIG. 3, the data management server 5, configured using one or more computers, includes, for example, a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk rewritable (DVD-RW) drive 514, and a medium I/F 507.

The CPU 501 controls operations of the data management server 5 entirely. The ROM 502 stores one or more programs for driving the CPU 501, such as initial program loader (IPL). The RAM 503 is used as a work area of the CPU 501. The HD 504 stores various data, such as programs. The HDD controller 505 controls reading or writing of various data to the HD 504 under the control of the CPU 501. The display 506 displays various information, such as cursor, menu, windows, characters, or images. The external device connection I/F 508 is an interface for connecting with various external devices. For example, the external device is a universal serial bus (USB) memory, a printer, or the like. The network I/F 509 is an interface used for data communication using the communication network 100. The bus line 510 is an address bus and a data bus for electrically connecting each one of components, such as the CPU 501, illustrated in FIG. 3.

The keyboard 511 is a type of input unit having a plurality of keys for inputting characters, numerals, various instructions, or the like. The pointing device 512 is a type of input unit, such as a mouse, used for selecting and executing various instructions, selecting a process target object, moving a cursor, or the like. The DVD-RW drive 514 controls reading or writing of various data to DVD-RW 513, which is as an example of removable recording medium. In addition to DVD-RW, other media, such as DVD-R, Blu-ray Disc, or the like can be used. The medium I/F 507 controls reading or writing (storing) of data to a medium 515 (recording medium), such as a flash memory, or the like.

(Hardware Configuration of MFP)

Figure 4:
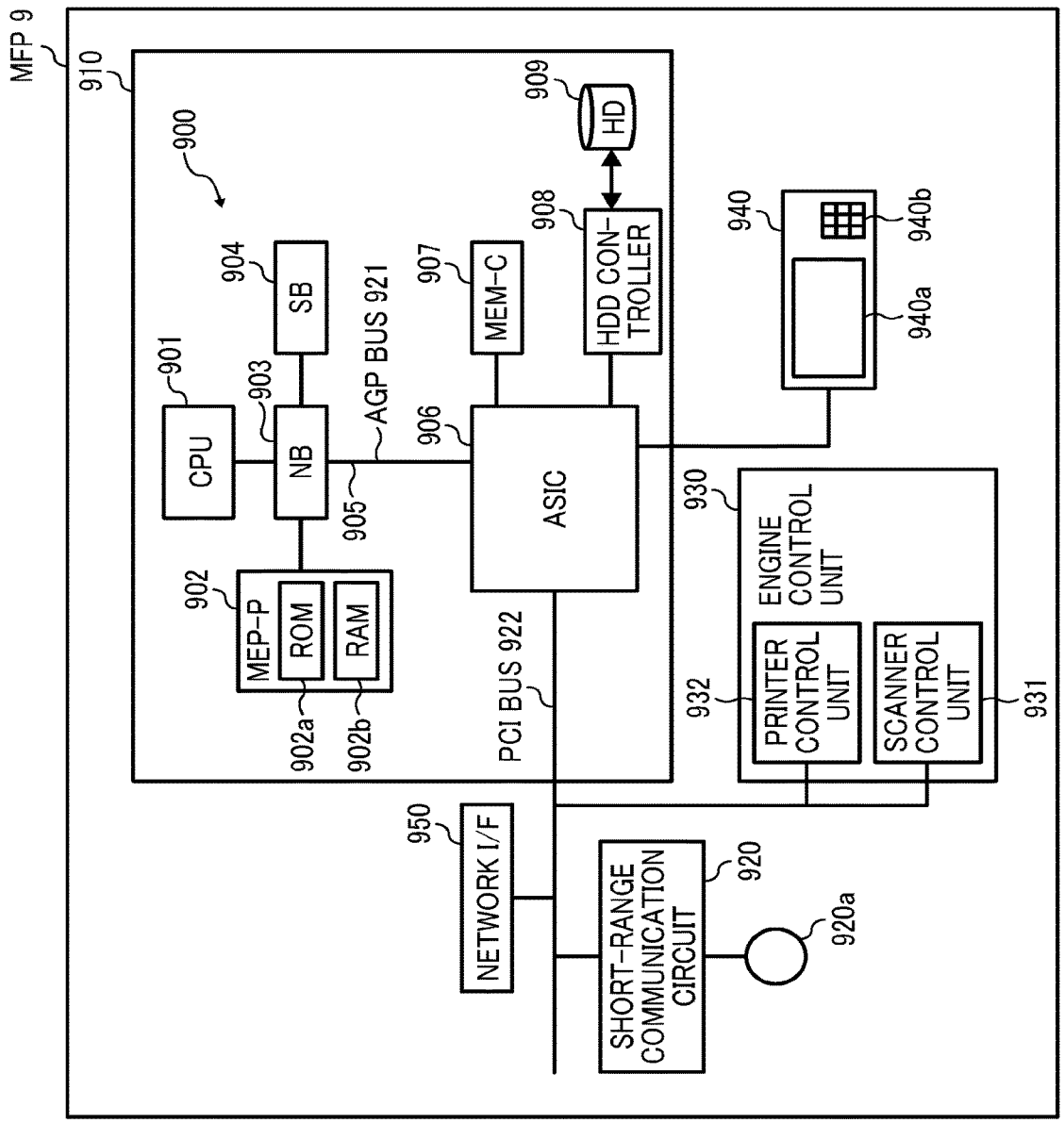
FIG. 4 is an example of a hardware block diagram of a multifunction peripheral (MFP)

FIG. 4 is an example of a hardware block diagram of the MFP 9. As illustrated in FIG. 4, the MFP 9 includes, for example, a controller 910, a short-range communication circuit 920, an engine control unit 930, an operation panel 940, and a network IN 950.

As illustrated in FIG. 4, the controller 910 includes, for example, a CPU 901, a system memory (MEM-P) 902, a north bridge (NB) 903, a south bridge (SB) 904, an application specific integrated circuit (ASIC) 906, a local memory (MEM-C) 907, a HDD controller 908, and a HD 909 as a storage, in which the NB 903 and the ASIC 906 are connected with each other using an accelerated graphics port (AGP) bus 921.

The CPU 901 is a control unit that controls the MFP 9 entirely. The NB 903 is a bridge for connecting the CPU 901, the MEM-P 902, the SB 904 and the AGP bus 921. The NB 903 includes, for example, a memory controller that controls reading and writing to the MEM-P 902, and a peripheral component interconnect (PCI) master and an AGP target.

The MEM-P 902 includes, for example, a ROM 902*a* and a RAM 902*b*. The ROM 902*a* serves as a memory storing programs and data for implementing each function of the controller 910. The RAM 902*b* serves as a memory for loading programs and data, and for drawing data used for the printing operation. The programs stored in the RAM 902*b* may be provided by recording on a recording medium, readable by a computer, such as CD-ROM, CD-R, DVD, or the like in files using installable format or executable format.

The SB 904 is a bridge for connecting the NB 903, the PCI device and a peripheral device. The ASIC 906 is an integrated circuit (IC) designed for image processing application having a hardware element for image processing, and serves as a bridge to connect the AGP bus 921, a PCI bus 922, the HDD controller 908, and the MEM-C 907 respectively. The ASIC 906 includes, for example, a memory controller that controls PCI target, AGP master, arbiter (ARB) that is a core of the ASIC 906, and the MEM-C 907, a plurality of direct memory access controllers (DMACs) that perform a rotation of image data using a hardware logic, and a PCI unit that transfers data to a scanner control unit 931 and a printer control unit 932 via the PCI bus 922. Further, the ASIC 906 can be connected to a universal serial bus (USB) interface or an interface of Institute of Electrical and Electronics Engineers 1394 (IEEE 1394).

The MEM-C 907 is a local memory used as a copy image buffer and a code buffer. The HD 909 is a storage for storing image data, storing font data used for printing, and storing forms. The HDD controller 908 controls reading or writing of data to the HD 909 under the control of the CPU 901. The AGP bus 921 is a bus interface used for a graphics accelerator card proposed for speeding up graphics processing, and the graphics accelerator card can be accelerated by accessing the MEM-P 902 directly with higher throughput.

The short-range communication circuit 920 is provided with an antenna 920*a*. The short-range communication circuit 920 is a communication circuit using, such as near field communication (NFC: registered trademark) or Bluetooth (registered trademark).

Further, the engine control unit 930 includes, for example, the scanner control unit 931 and the printer control unit 932. Further, the operation panel 940 includes, for example, a panel display unit 940*a* and an input key 940*b*. The panel display unit 940*a* displays, for example, current setting values and a selection screen, and receives inputs from an operator. The input key 940*b* includes, for example, a numeric keypad used for inputting settings as conditions of image forming, such as density setting condition, and a start key for inputting an instruction of a start of copying. The controller 910 controls the MFP 9 entirely. For example, the controller 910 controls drawing, communication, input from the operation panel 940. The scanner control unit 931 or the printer control unit 932 includes, for example, an image processing unit for error diffusion and gamma conversion.

Further, by operating an application switching key on the operation panel 940, a document box function, a copying function, a printer function, and a facsimile function can be switched and selected for the MFP 9. When the document box function is selected, a document box mode is set, when the copying function is selected, a copying mode is set, when a printer function is selected, a printer mode is set, and when the facsimile function is selected, a facsimile mode is set.

Further, the network I/F 950 is an interface used for data communication using the communication network 100. The short-range communication circuit 920 and the network IX 950 are electrically connected to the ASIC 906 via the PCI bus 922.

(Functional Configuration of Communication System)

Figure 5:
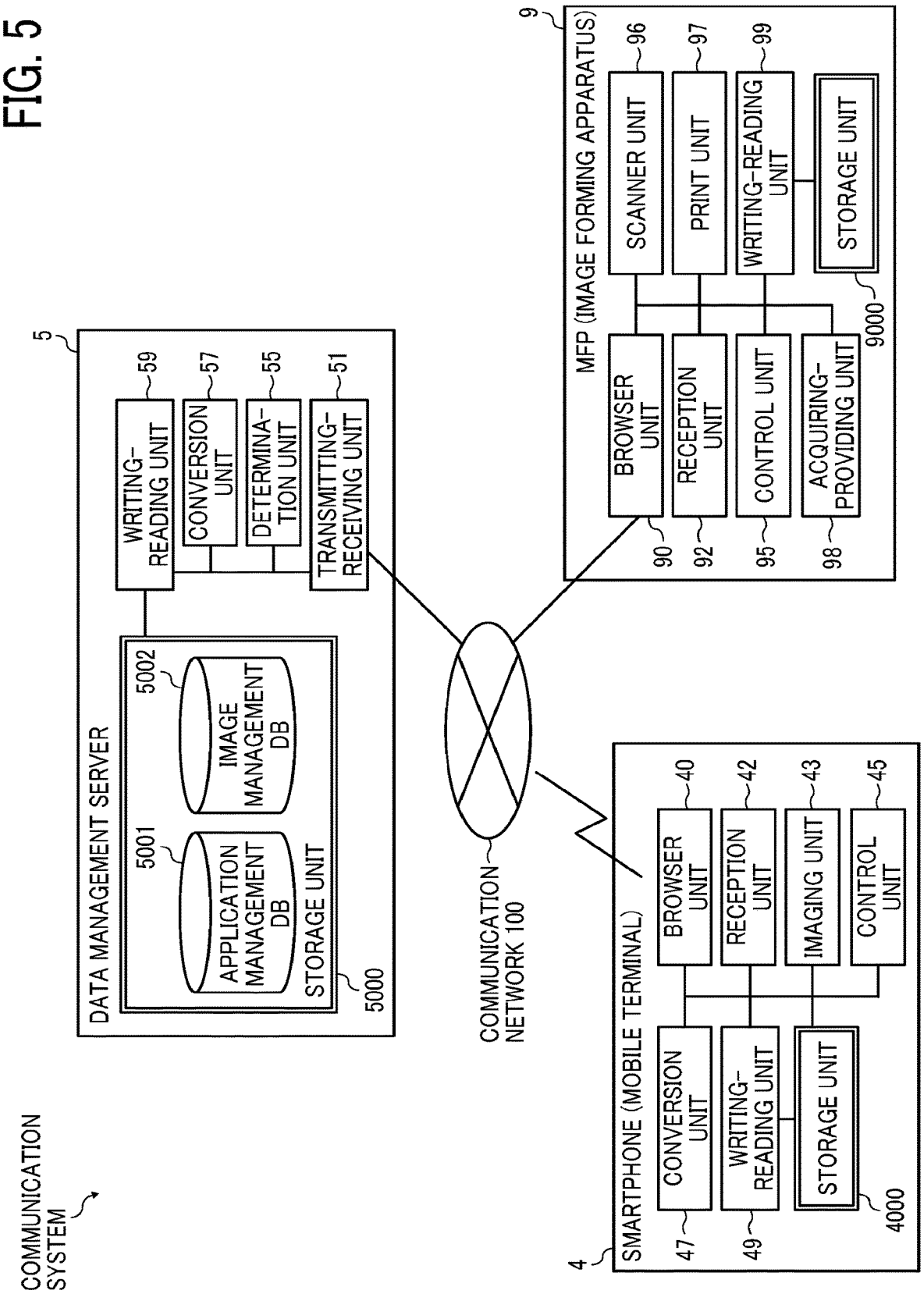
FIG. 5 is an example of a functional block diagram of a communication system.

Hereinafter, a description is given of a functional configuration of the communication system with reference to FIGS. 5 and 6. FIG. 5 is an example functional block diagram of the communication system.

(Functional Configuration of Smartphone)

Hereinafter, a description is given of a functional configuration of the smartphone 4. As illustrated in FIG. 5, the smartphone 4 includes, for example, a browser unit 40, a reception unit 42, an imaging unit 43, a control unit 45, a conversion unit 47, and a writing-reading unit 49. Each of the functional units can be implemented when any of the components illustrated in FIG. 2 are operated under an instruction from the CPU 401 executing one or more programs created for smartphone, loaded on the RAM 403 from the EEPROM 404. The smartphone 4 further includes a storage unit 4000 implemented by the RANI 403 and the EEPROM 404 illustrated in FIG. 2.

(Function of Smartphone)

Hereinafter, a description is given of a functional configuration of the smartphone 4 in detail.

The browser unit 40, implemented by an instruction from the CPU 401 illustrated in FIG. 2, is a function implemented by a web browser.

The reception unit 42, implemented by an instruction from the CPU 401, is a function of receiving operations, such as a selection operation by a user.

The imaging unit 43 is mainly implemented by the CMOS sensor 405, the imaging element I/F 406, or the CMOS sensor 413 and the imaging element IN 414 under an instruction from the CPU 401.

The control unit 45, implemented by an instruction from the CPU 401, is a function implemented by operating system (OS) installed on the smartphone 4.

The conversion unit 47, implemented by an instruction from the CPU 401, performs a function of converting image data into text data by recognizing and decoding code information, such as quick response (QR) code (registered trademark).

The writing-reading unit 49, implemented by an instruction from the CPU 401, performs processing of storing various data in the storage unit 5000 and reading various data stored in the storage unit 5000.

(Functional Configuration of Data Management Server)

Hereinafter, a description is given of a functional configuration of the data management server 5. As illustrated in FIG. 5, the data management server 5 includes, for example, a transmitting-receiving unit 51, a determination unit 55, a conversion unit 57, and a writing-reading unit 59. Each of the functional units can be implemented when any of the components illustrated in FIG. 3 are operated under the instruction of the CPU 501 executing one or more programs created for server, loaded on the RAM 503 from the HD 504. The data management server 5 further includes a storage unit 5000 implemented by the RAM 503 and the HD 504 illustrated in FIG. 3.

(Application Management Table)

FIG. 6 a is a conceptual diagram of an application management table. The storage unit 5000 stores, for example, an application management database (DB) 5001 including the application management table illustrated in FIG. 6A. In this application management table, one or more service identification (service ID) identifying one or more services, one or more browser identification (browser ID) identifying one or more browsers, and one or more uniform resource locators (URLs) of one or more application software programs are associated with each other. Hereinafter, the service ID indicates one or more service IDs, the browser ID indicates one or more browser IDs, and the URL indicates one or more URLs.

The service ID is an example of service identification information identifying each service allocated for each school that uses the data management server 5. FIG. 6A is an example case where each service provided for each school is specified, and thereby the same service ID is assigned to the same school, such as university. Instead of each school (e.g., university), the service ID can be assigned to each department, each subject, each professor, each class, each student, or the like.

The browser ID is an example of browser identification information identifying a browser created for the smartphone or a browser created for the MFP.

The URL of application software indicates information indicating a storing location of each application, such as storing location information (an example of first storing location information) of the image capturing application (an example of first application), or storing location information (an example of second storing location information) of the scanning application for recognizing QR code (an example of second application).

For example, the image capturing application (first application) is installed and executed on the smartphone 4 by downloading the image capturing application. For example, the image capturing application is used when capturing an image of an answer sheet filled out by a student.

For example, the scanning application for recognizing QR code (second application) is installed and executed on the MFP 9 by downloading the scanning application for recognizing QR code. For example, the scanning application for recognizing QR code is used to recognize a QR code by scanning or reading the QR code printed on an answer sheet after the answer sheet is filled out with answers by a student.

(Image Management Table)

FIG. 6B is a conceptual view of an image management table. The storage unit 5000 stores, for example, an image management database (DB) 5002 including the image management table illustrated in FIG. 6B. The image management table stores, for example, service identification (service ID), file name, lecture number, student number and date in association with each other.

The file name indicates, for example, a file name when a student digitizes an answer sheet in electronic format after filling out the answer sheet, and a file name when a student digitizes a report sheet in electronic format after completing the report sheet.

The lecture number is a number identifying each lecture. The student number is an example of user identification information (user ID) identifying each student. The lecture number can be replaced with class room number or room number. Further, instead of the student number, driver's license number, social security number, and tax number can be used as the user ID.

The date indicates, for example, a date on which an answer sheet was uploaded after the answer sheet was digitized, or a date on which a report sheet was uploaded after the report sheet was digitized. In other words, the date indicates, for example, a date when a student submitted a filled-out answer sheet to a school (e.g., professor), or a date when a student submitted a completed homework report sheet to a school (e.g., professor).

(Functional of Data Management Server)

Hereinafter, a description is given of a functional configuration of the data management server 5 in detail.

The transmitting-receiving unit 51 is implemented by an instruction from the CPU 501 and processing for the network I/F 509 illustrated in FIG. 3. For example, the transmitting-receiving unit 51 transmits and receives various data or information to and from other terminal, device or system via the communication network 100.

The determination unit 55, implemented by an instruction from the CPU 501, performs various determination processing.

The conversion unit 57, implemented by an instruction from the CPU 501, performs a function of converting image data into text data by recognizing and decoding code information, such as QR code.

The determination unit 55 is implemented by an instruction from the CPU 501 executing operating system (OS) or the like.

The writing-reading unit 59, implemented by an instruction from the CPU 501, stores various data in the storage unit 5000 and reads various data stored in the storage unit 5000.

(Functional Configuration of MFP)

Hereinafter, a description is given of the functional configuration of the MFP 9. As illustrated in FIG. 5, the MFP 9 includes, for example, a browser unit 90, a reception unit 92, a control unit 95, a scanner unit 96, a print unit 97, an acquiring-providing unit 98, and a writing-reading unit 99. Each of the functional units can be implemented when any of the components illustrated in FIG. 4 are operated under the instruction of the CPU 901 executing one or more programs created for MFP, loaded on the RAM 902*b* from the HD 909. The MFP 9 further includes a storage unit 9000 implemented by the RAM 902*b* and HD 909 illustrated in FIG. 4.

(Function of MFP)

Hereinafter, a description is given of a functional configuration of the MFP 9.

The browser unit 90, implemented by an instruction from the CPU 901 illustrated in FIG. 4, is a function implemented by a web browser.

The reception unit 92, implemented by an instruction from the CPU 901, is a function of receiving operations, such as a selection operation by a user.

The control unit 95 is implemented by an instruction from the CPU 401 executing operating system (OS) or the like.

The scanner unit 96 is a function implemented by the scanner control unit 931 under an instruction from the CPU 901.

The print unit 97 is a function implemented by the printer control unit 932 under an instruction from the CPU 901.

The acquiring-providing unit 98 is implemented by the short-range communication circuit 920 and the antenna 920*a* under an instruction from the CPU 901. The acquiring-providing unit 98 acquires and provides data using the short-range wireless communication between each IC card and the smartphone 4.

The writing-reading unit 99, implemented by an instruction from the CPU 901, stores various data in the storage unit 9000 and reads various data stored in the storage unit 9000.

(Processing and Operation)

Figure 8:
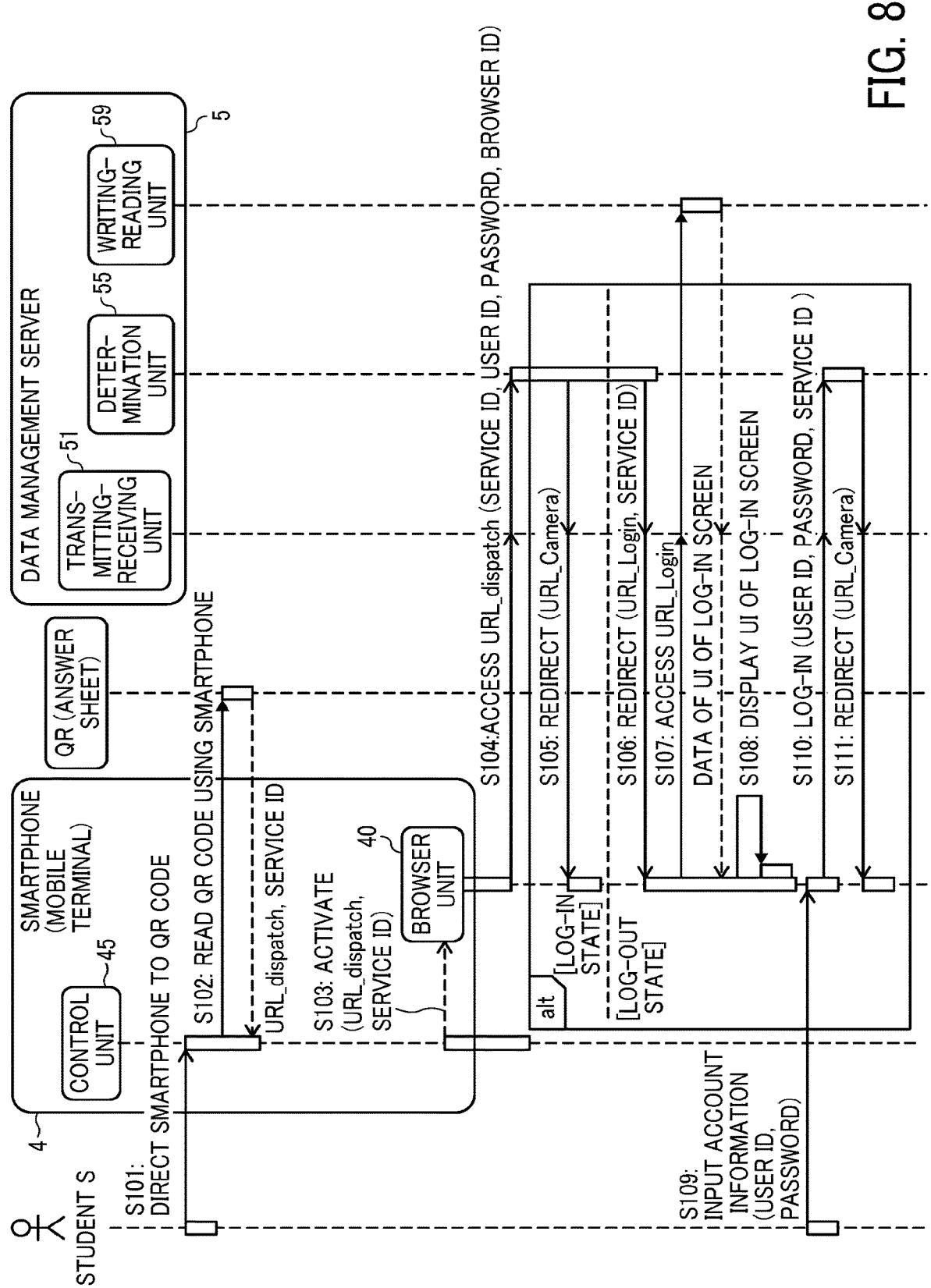
FIGS. 8 and 9 are examples of sequence diagrams indicating a process of uploading data of filled-out answer sheet when a transmission source terminal is a smartphone.
Figure 9:
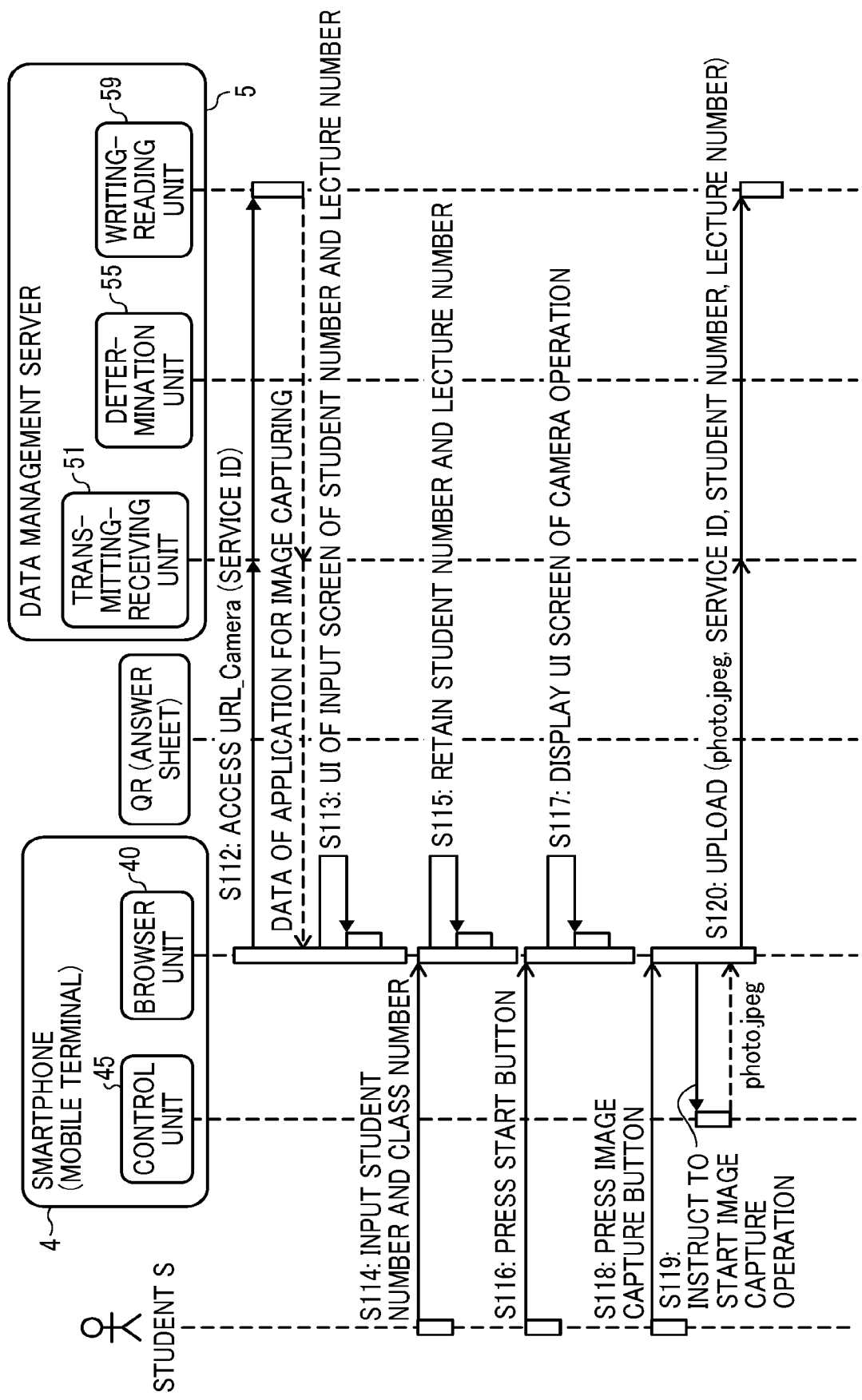
Figure 10:
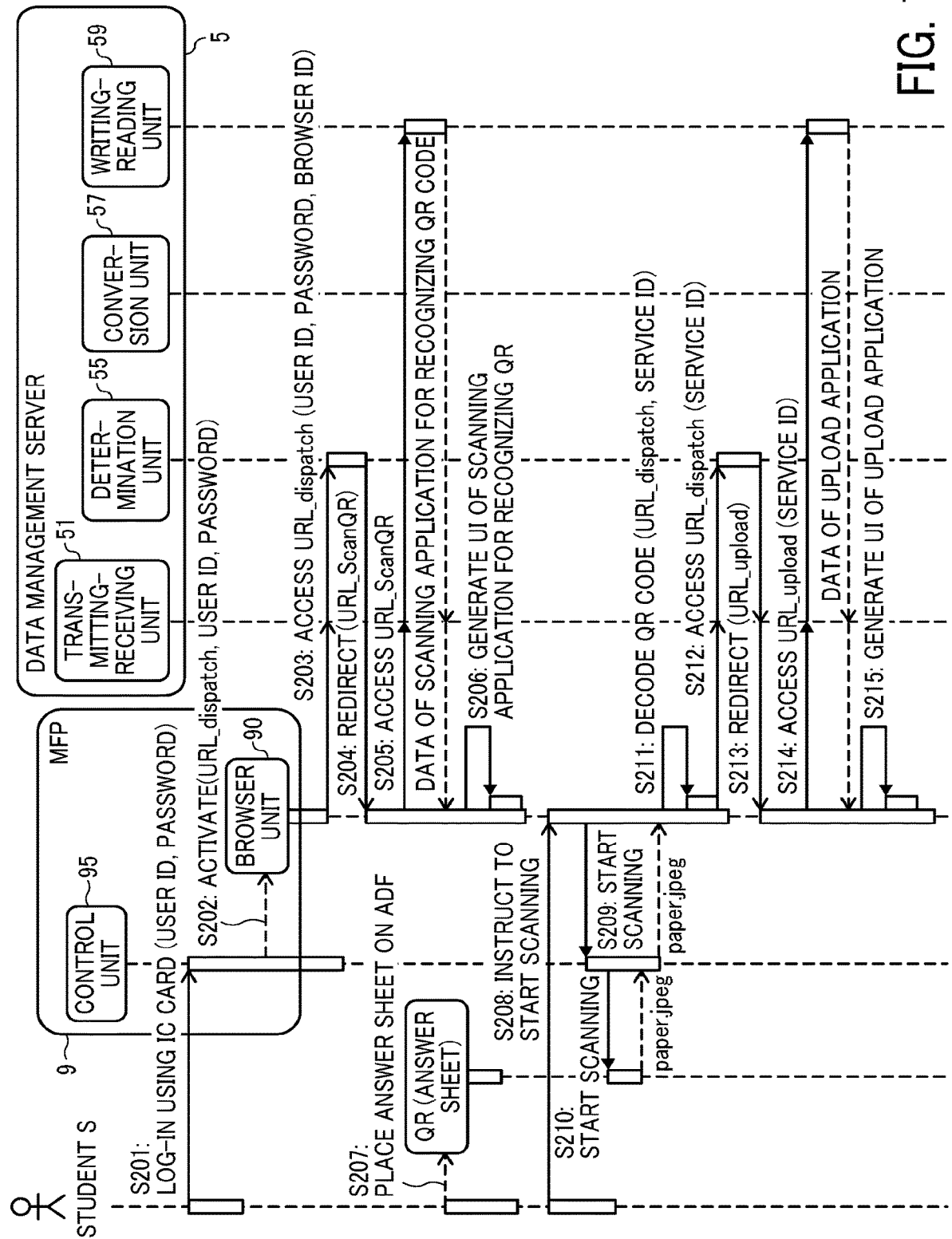
FIGS. 10 and 11 are examples of sequence diagrams indicating a process of uploading data of filled-out answer sheet when a transmission source terminal is a MFP.
Figure 11:
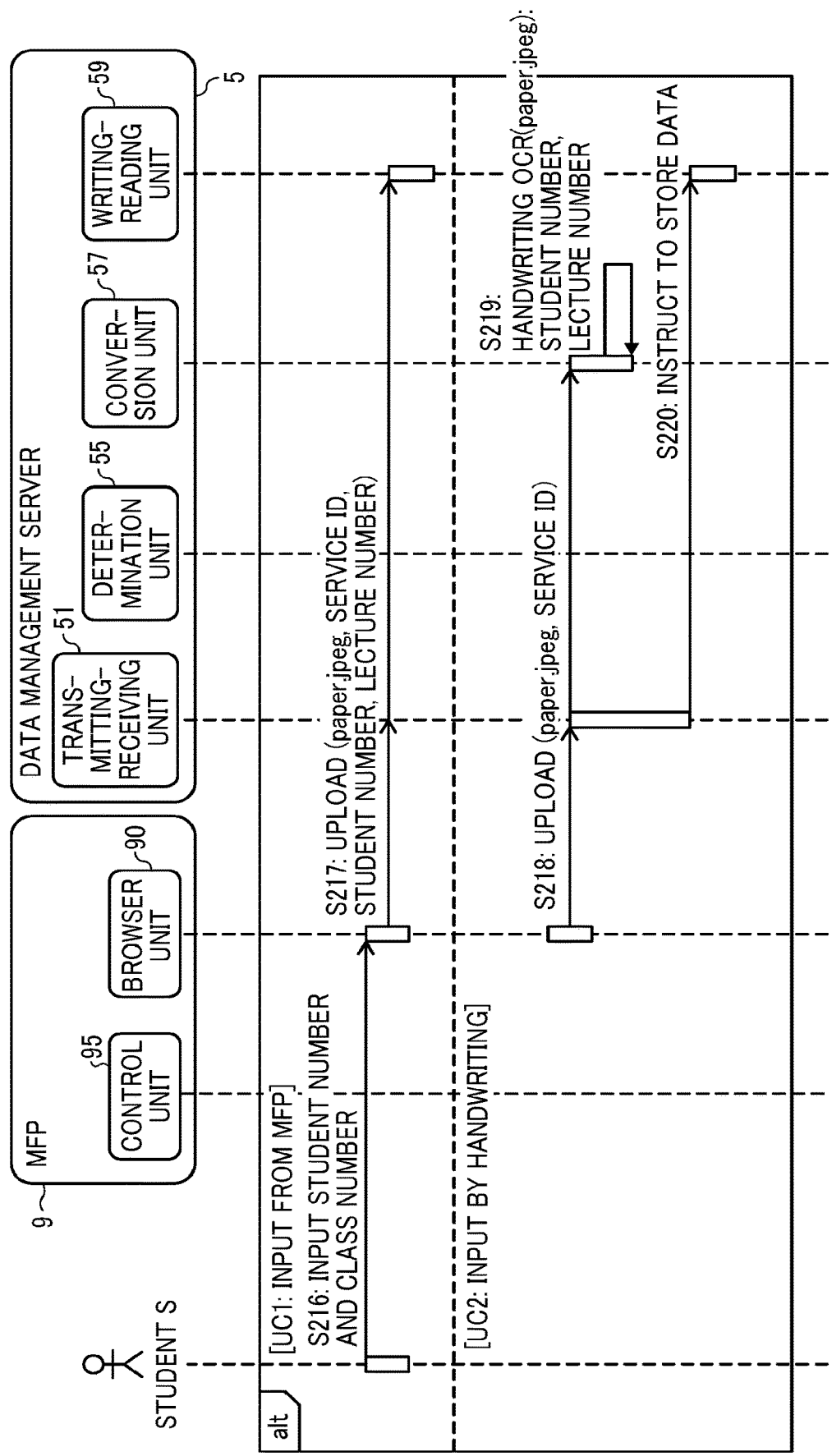

Hereinafter, a description is given of processing or operation of the communication system with reference to FIGS. 7 to 12. FIG. 7 is a scheme of processing and operation of uploading data using patterns P1, P2, and P3. FIGS. 8 and 9 are examples of sequence diagrams indicating a process of uploading data of filled-out answer sheet when a transmission source terminal is the smartphone 4. FIGS. 10 and 11 are examples of sequence diagrams indicating a process of uploading data of filled-out answer sheet when a transmission source terminal is the MFP 9.

A first pattern P1 is indicated in the upper part of FIG. 7. In the first pattern P1, the student S fills out an answer sheet of test including attendance confirmation information, captures an image of the answer sheet and digitizes the image using the smartphone 4 used by the student S, enters or inputs given information such as student number to the smartphone 4, and then uploads image data obtained by digitization to the data management server 5 (steps S101 to S120), in which the image data is digitized by the smartphone 4 and then uploaded to the data management server 5 from the smartphone 4. The QR code is printed on the answer sheet before distributed to the student S.

Further, a second pattern P2 is indicated from the upper part to lower part of FIG. 7. In the second pattern P2, the student S fills out an answer sheet of test including attendance confirmation information, places the answer sheet filled with answers on an automatic document feeder (ADF) of the MFP 9, digitizes an image of the answer sheet using a scanner of the MFP 9, enters or inputs given information such as student number to the MFP 9, and then uploads image data obtained by digitization to the data management server 5 (steps S201 to S217), in which the image data is digitized by the MFP 9 and then uploaded to the data management server 5 from the MFP 9.

Further, a third pattern P3 is indicated in the lower part of FIG. 7. In the third pattern P3, the teacher T collects filled-out answer sheets from every student, places the answer sheets on the ADF of the MFP 9, digitizes images of the answer sheets using a scanner of the MFP 9, enters or inputs given information such as lecture number to the MFP 9, and then uploads image data obtained by digitization to the data management server 5 (steps S201 to S218 without performing S216 and S217), in which the image data is digitized by the MFP 9 and then uploaded to the data management server 5 from the MFP 9. In a case of the third pattern P3, the student S writes the student number on the answer sheet by handwriting, and then the student number is recognized by performing the optical character reading (OCR) at the data management server 5 (step S219).

When step number indicated with "S" in FIG. 7 and step numbers indicated with "S" in FIGS. 8 to 11 are the same step number, the same step number indicates the same processing. Further, as illustrated in FIGS. 7 to 11, the smartphone 4 is used as the transmission source terminal in the first pattern P1, and the MFP 9 is used as the transmission source terminal in the second pattern P2 and the third pattern P3.

(First Pattern P1)

Hereinafter, a description is given of the first pattern P1 with reference to FIGS. 7, 8, 9 and 12. At first, the student S directs his or her smartphone 4 to a QR code printed at an upper left corner of an answer sheet filled with answers by the student S (step S101).

In response to receiving the operation performed by the student S at the reception unit 42, under an instruction of the control unit 45, the imaging unit 43 captures an image of the QR code, and then the conversion unit 47 decodes the QR code (step S102).

The QR code is embedded with URL_dispatch, which is a URL of the determination unit 55 of the data management server 5, and a service ID. Therefore, the control unit 45 can obtain the URL_dispatch and the service ID by decoding the QR code.

Further, the control unit 45 activates the browser unit 40 by performing the processing in step S102, and transfers the URL_dispatch and the service ID to the browser unit 40 (step S103).

Figure 12:
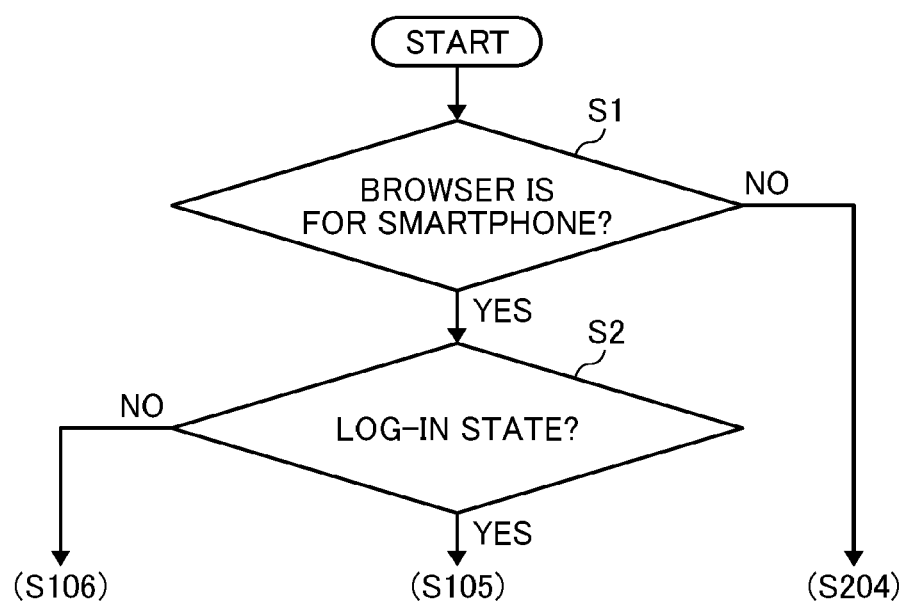
FIG. 12 is a flow chart indicating a determination processing by a determination unit.

Then, the browser unit 40 transmits, to the URL_dispatch obtained from the control unit 45, the service ID, the browser ID of the browser unit 40, the user ID and password of the user currently using the smartphone 4 (step S104). Then, the data management server 5 receives the service ID, the browser ID, the user ID and the password, and the determination unit 55 performs determination processing of FIG. 12. FIG. 12 is a flow chart indicating a determination processing performed by the determination unit 55.

As illustrated in FIG. 12, the determination unit 55 searches the application management DB 5001 using the received browser ID as a search key to determine whether or not a browser type of the transmission source terminal of the browser ID is a browser created for smartphone (step S1).

If the determination unit 55 determines that the browser type of the transmission source terminal identified by the received browser ID is the browser created for smartphone (S1: YES), the determination unit 55 further determines whether or not the transmission source terminal is already in a log-in state (step S2).

Then, if the determination unit 55 determines that that the transmission source smartphone is already in the log-in state (S2: YES), the sequence proceeds to step S105 to be described later.

Further, if the determination unit 55 determines that the transmission source smartphone is not in the log-in state (if determined as a log-out state) (S2: NO), the sequence proceeds to step S106 to be described later.

Further, if the determination unit 55 determines that the browser type of the transmission source terminal identified by the received browser ID is not the browser created for smartphone (if determined as a browser created for MFP) (S1. NO), the sequence proceeds to step S204 to be described later.

Hereinafter, a description is given of a case when step S1 is "YES" and step S2 is "YES." Based on a determination result of the determination unit 55, the transmitting-receiving unit 51 transmits, to the browser unit 40, information indicating a URL ("URL_Camera") of application for image capturing to be used for capturing an image of the answer sheet (step S105).

Hereinafter, a description is given of another case when step S1 is "YES" and step S2 is "NO." The transmitting-receiving unit 51 transmits information indicating a URL for login to the browser unit 40 (step S106). In step S106, the service ID received in step S104 is also transmitted to the browser unit 40 to inform that a series of processing is being performed.

Then, in the smartphone 4, the browser unit 40 accesses the URL for login via the transmitting-receiving unit 51 (step S107). Then, the transmitting-receiving unit 51 transmits, to the browser unit 40, data of user interface (UI) of a log-in screen stored in association with the URL for login, by using the writing-reading unit 59.

Then, in the smartphone 4, the browser unit 40 displays the UI of log-in screen on the display 418 (step S108)

When the reception unit 42 receives the user ID and password input or entered by the student S as account information, the browser unit 40 recognizes an input of the user ID and the password (step S109).

Then, the browser unit 40 transmits login information to the data management server 5 (step S110). The login information includes, for example, the user ID and password input or entered in step S109, and the service ID transmitted in step S104. With this configuration, in the data management server 5, the transmitting-receiving unit 51 receives the service ID, the user ID and the password, and then the determination unit 55 performs the login authentication processing.

Then, if the determination unit 55 recognizes that the user is a valid user based on the login authentication processing (step S110), as similar to step S105, the transmitting-receiving unit 51 transmits, to the browser unit 40, information of "URL_Camera" indicating the URL of application for image capturing used for capturing an image of the answer sheet (step S111).

Then, after step S105 or step S111, in the smartphone 4, the browser unit 40 accesses the URL of application for image capturing via the transmitting-receiving unit 51 (step S112). In step S112, the service ID received in step S103 is also transmitted to the data management server 5 to inform that a series of processing is being performed. Then, the writing-reading unit 59 transmits, to the browser unit 40, data of the application for image capturing stored in a storing location indicated by the URL of the application for image capturing, via the transmitting-receiving unit 51.

Then, the browser unit 40 installs the received data of the application for image capturing and executes the application for image capturing to display an UI of input screen of student number and lecture number on the display 418 using the executed application for image capturing (step S113).

Then, when the reception unit 42 receives the student number and lecture number input or entered by the student S, the application for image capturing executed by the browser unit 40 recognizes the input of student number and lecture number (step S114).

Then, the application for image capturing executed by the browser unit 40 retains the input student number and lecture number (step S115).

In this state, if the reception unit 42 receives pressing of a start button performed by the student S, the application for image capturing executed by the browser unit 40 recognizes the pressing of the start button (step S116).

Then, the application for image capturing executed by the browser unit 40 displays a UI screen of camera operation on the display 418 (step S117). In this state, the student S uses the smartphone 4 to set the entire area of answer sheet filled out by himself or herself as an image capture range of the smartphone 4.

Then, if the reception unit 42 receives pressing of an image capture button performed by the student S, the application for image capturing executed by the browser unit 40 recognizes the pressing of the image capture button (step S118).

Then, the application for image capturing executed by the browser unit 40 informs a start of the image capture operation to the control unit 45 (step S119). Then, the control unit 45 instructs the imaging unit 43 to start the image capture operation to obtain image data using a given format, such as joint photographic experts group (JPEG) format, which covers the entire area of the answer sheet. The format of image data can be any format other than JPEG format.

Then, the application for image capturing executed by the browser unit 40 transmits or uploads, to the data management server 5, the student number and lecture number retained in step S115 and the image data obtained in step S119 (step S120). In step S120, the service ID received in step S103 is also transmitted to the data management server 5 to inform that a series of processing is being performed. Then, in the data management server 5, the writing-reading unit 59 stores and controls the uploaded image data, student number and lecture number in the image management DB 5002 in association with the received service ID. In this configuration, the uploaded date is also stored. The first pattern P1 can be performed as above described.

(Second Pattern P2)

Hereinafter, a description is given of the second pattern P2 with reference to FIGS. 7, 10 and 11. At first, when the student S puts or places his or her IC card over the MFP 9, the acquiring-providing unit 98 of the MFP 9 acquires the user ID and password of the student S from the IC card, and then the control unit 95 performs the login authentication processing (step S201).

Then, the control unit 95 activates the browser unit 90 by performing the processing in step S201, and transfers, to the browser unit 90, information of "URL_dispatch," which is a URL of the determination unit 55, and the acquired user ID and password (step S202).

Then, the browser unit 90 transmits, to the URL of the determination unit 55 (URL_dispatch) acquired from the control unit 95, the browser ID of the browser unit 90, the user ID and the password (step S203). Then, in the data management server 5, the transmitting-receiving unit 51 receives the browser ID, the user ID and the password, and the determination unit 55 performs the determination processing of FIG. 12.

Hereinafter, a description is given of a case when step S1 is "NO." The transmitting-receiving unit 51 transmits, to the browser unit 90, information of "URL_ScanQR" indicating a URL of scanning application for recognizing QR code printed on the answer sheet (step S204).

Then, in the MFP 9, the browser unit 90 accesses the URL of scanning application for recognizing QR code via the transmitting-receiving unit 51 to request the scanning application for recognizing QR code (step S205). Then, the writing-reading unit 59 transmits, to the browser unit 90, data of the scanning application for recognizing QR code stored in a storing location indicated by the URL of scanning application for recognizing QR code, via the transmitting-receiving unit 51.

Then, in the MFP 9, the browser unit 90 installs the received data of scanning application for recognizing QR code and executes the scanning application for recognizing QR to generate an UI of the executed scanning application for recognizing QR (step S206).

Then, the student S places his or her answer sheet filled with answers on an automatic document feeder (ADF) of the MFP 9 (step S207).

Then, when the reception unit 92 receives a scan start instruction performed by the student S, the scanning application for recognizing QR executed by the browser unit 90 recognizes the start of scanning operation (step S208).

Then, the scanning application for recognizing QR executed by the browser unit 90 transmits the scan start instruction to the control unit 45 (step S209).

Then, the control unit 45 instructs the scanner unit 96 to start the scanning operation to digitize the entire answer sheet including the QR code to obtain image data in JPEG format (step S210) The format of image data can be any format other than JPEG format.

Then, the browser unit 90 uses the executed scanning application for recognizing QR code to decode the QR code included in the image data obtained by the scanner unit 96 (step S211). Since the QR code is embedded with the URL of the determination unit 55 (URL_dispatch) and the service ID, the browser unit 90 can obtain the URL of the determination unit 55 (URL_dispatch) and the service ID by decoding the QR code.

Then, the browser unit 90 transmits, to the URL of the determination unit 55 (URL_dispatch) obtained by decoding the QR code, the service ID obtained by decoding the QR code (step S212). Then, in the data management server 5, the transmitting-receiving unit 51 receives the service ID, and the determination unit 55 recognizes that the service ID is received.

Then, the transmitting-receiving unit 51 transmits, to the browser unit 90, information of "URL upload" indicating a URL of an upload application to be used for uploading the image data obtained by digitizing the answer sheet (step S213). In this description, the upload application is an example of a third application, and the information indicating the URL of the upload application is an example of third storing location information.

Then, in the MFP 9, the browser unit 90 accesses the URL of the upload application via the transmitting-receiving unit 51 to request the upload application (step S214). Then, the writing-reading unit 59 transmits, to the browser unit 90, data of the upload application stored in a storing location indicated by the URL of the upload application, via the transmitting-receiving unit 51.

Then, in the MFP 9, the browser unit 90 installs the data of upload application and executes the upload application to generate an UI of the upload application (step S215). Then, the MFP 9 can upload, to the data management server 5, the image data obtained by digitizing the answer sheet.

Then, as illustrated in FIG. 11, when the reception unit 92 receives the student number and the lecture number input by the student S to operation panel 940 of the MFP 9, the upload application executed by the browser unit 90 recognizes the input of the student number and lecture number (step S216).

Then, the upload application executed by the browser unit 90 transmits or uploads, to the data management server 5, the student number and lecture number input in step S216, and the image data obtained in step S211 (step S217). In step S217, the service ID acquired in step S211 is also transmitted to the data management server 5 to inform that a series of processing is being performed. Then, in the data management server 5, the writing-reading unit 59 stores the uploaded image data, the student number and the lecture number in the image management DB 5002 in association with the received service ID. In this configuration, the uploaded date is also stored. The second pattern P2 can be performed as above described.

(Third Pattern P3)

Hereinafter, a description is given of the third pattern P3 with reference to FIGS. 7, 10 and 11. In the third pattern P3, the operation performed by the student S in steps S201 to S215 in the second pattern P2 is performed by the teacher T instead of the student S, and thereby the description of steps S201 to S215 is omitted. In the third pattern P3, the following steps S218, S219, and S220 is performed instead of steps S216 and S217 performed in the second pattern P2.

In the third pattern P3, the student S writes his or her student number and a lecture number when filling out the answer sheet by handwriting. Therefore, it is not necessary to input the student number and lecture number to the operation panel 940 of the MFP 9, which is performed in step S216 in the second pattern P2.

Therefore, the upload application executed by the browser unit 90 transmits or uploads, to the data management server 5, the image data obtained by digitizing the answer sheet including the student number and lecture number handwritten by the student S (step S218). In step S218, the service ID acquired in step S211 is also transmitted to the data management server 5 to inform that a series of processing is being performed.

Then, in the data management server 5, the conversion unit 57 performs the optical character reading (OCR) to the image data of the answer sheet, transmitted from the upload application executed by the browser unit 90, to convert the image data corresponding to the handwritten student number and lecture number into text data (step S219).

Then, under a storing instruction of the conversion unit 57, the writing-reading unit 59 stores the uploaded image data, the student number and the lecture number obtained by the conversion unit 57 in the image management DB 5002 in association with the received service ID (step S220). In this configuration, the uploaded date is also stored. Further, the date can be date alone or date and time. The third pattern P3 can be performed as above described.

As to the above described embodiment, collection of homework report sheets and attendance confirmation cards can be performed by setting a lower level of security for preventing the fraud compared to collection of test answer sheets, in which the collection of electronic data can be performed using different digitization method depending on the collection target.

As to the above described embodiment, applications corresponding to the types of terminal (e.g., smartphone, MFP), used as a device for collecting data, can be prepared to support or assist collection methods corresponding to a plurality of digitizing methods, with which specific digitizing methods corresponding to specific collection targets, such as answer sheets and report sheets, can be provided.

Further, in the above described embodiment, the communication system is applied to an educational field, such as schools, but is not limited thereto. For example, the communication system can be applied to any organization, such as companies.

Each of the functions of the embodiment described above may be implemented by one or more processing circuits or circuitry. Processing circuitry includes a programmed processor, as a processor includes circuitry. A processing circuit also includes devices such as an application specific simultaneous circuit (ASIC), digital signal processor (DSP), field programmable gate array (FPGA) and conventional circuit components arranged to perform the recited functions.

In the above described embodiment, the QR code is an example of code information. The code information includes, for example, a two-dimensional code, such as bar code, other than the QR code, and a one-dimensional bar code. Further, the scanning application for recognizing QR code is an example of scanning application for recognizing the code information.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

Any one of the above-described operations may be performed in various other ways, for example, in an order different from the one described above. The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid-state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A server, comprising:
   circuitry configured to
   receive, from a transmission source terminal via a communication network, browser identification information identifying a web browser installed on the transmission source terminal;
   determine, based on the received browser identification information, whether the transmission source terminal is a mobile terminal because the web browser is a mobile terminal web browser or whether the transmission source terminal is an image forming apparatus because the web browser is an image forming apparatus web browser;
   when determining that the transmission source terminal is the mobile terminal, transmit, to the transmission source terminal being the mobile terminal, first application storing location information indicating a storing location of a first application; and
   when determining that the transmission source terminal is the image forming apparatus, transmit, to the transmission source terminal being the image forming apparatus, second application storing location information, different from the first application storing location information, indicating a storing location of a second application.

2. The server according to claim 1, wherein when the transmission source terminal is the image forming apparatus, the circuitry is further configured to transmit, to the image forming apparatus via the communication network, third storing location information indicating a storing location of a third application used for uploading resultant data obtained by executing the second application at the image forming apparatus.

3. The server according to claim 1, wherein the first application corresponding to the transmitted first application storing location information is an application for image capturing, and the second application corresponding to the transmitted second application storing location information is a scanning application for recognizing code information.

4. The server according to claim 3,
wherein when determining that the transmission source terminal is the mobile terminal, the circuitry is further configured to
receive image data obtained by executing the application for image capturing at the mobile terminal, and user identification information identifying a user of the mobile terminal from the mobile terminal, and
store the received image data and the user identification information in a memory in association with each other.

5. The server according to claim 3,
wherein when determining that the transmission source terminal is the image forming apparatus, the circuitry is further configured to
receive image data obtained by executing the scanning application at the image forming apparatus, and user identification information identifying a user input for a recording medium used as a source of the image data scanned by executing the scanning application, and
store the received image data and the user identification information in a memory in association with each other.

6. The server according to claim 3, wherein the circuitry is further configured to
receive image data obtained by executing the scanning application at the image forming apparatus,
convert description information included in the image data into text data to obtain user identification information identifying a user who has described the description information on a recording medium used as a source of the image data scanned by executing the scanning application, and
store the received image data and the user identification information in a memory in association with each other.

7. A communication system, comprising:
the server according to claim 1; and
the image forming apparatus communicable with the server via the communication network.

8. The server of claim 1, wherein the server further comprises a memory storing, for each browser identifier of a plurality of browser identifiers, an address of an application to be used by the transmission source terminal having the web browser matching the browser identifier.

9. A method of controlling data communication using a server, the method comprising:
receiving, from a transmission source terminal via a communication network, browser identification information identifying a web browser installed on the transmission source terminal;
determining, based on the received browser identification information, whether the transmission source terminal is a mobile terminal because the web browser is a mobile terminal web browser or whether the transmission source terminal is an image forming apparatus because the web browser is an image forming apparatus web browser;
when determining that the transmission source terminal is the mobile terminal, transmitting, to the transmission source terminal being the mobile terminal, first application storing location information indicating a storing location of a first application; and
when determining that the transmission source terminal is the image forming apparatus, transmitting, to the transmission source terminal being the image forming apparatus, second application storing location information, different from the first application storing location information, indicating a storing location of a second application.

10. The method according to claim 9,
wherein when the transmission source terminal is the image forming apparatus, the transmitting step comprises transmitting, to the image forming apparatus via the communication network, third storing location information indicating a storing location of a third application used for uploading resultant data obtained by executing the second application at the image forming apparatus.

11. A non-transitory computer readable storage medium storing one or more instructions that, when performed by one or more processors, cause the one or more processors to execute a method of controlling data communication using a server, the method comprising:
receiving, from a transmission source terminal via a communication network, browser identification information identifying a web browser installed on the transmission source terminal;
determining, based on the received browser identification information, whether the transmission source terminal is a mobile terminal because the web browser is a mobile terminal web browser or whether the transmission source terminal is an image forming apparatus because the web browser is an image forming apparatus web browser;
when determining that the transmission source terminal is the mobile terminal, transmitting, to the transmission source terminal being the mobile terminal, first application storing location information indicating a storing location of a first application; and
when determining that the transmission source terminal is the image forming apparatus, transmitting, to the transmission source terminal being the image forming apparatus, second application storing location information, different from the first application storing location information, indicating a storing location of a second application.

* * * * *